(12) United States Patent
Coates et al.

(10) Patent No.: US 8,510,377 B2
(45) Date of Patent: *Aug. 13, 2013

(54) METHODS AND SYSTEMS FOR EXPLORING A CORPUS OF CONTENT

(75) Inventors: Tom Coates, London (GB); Paul Hammond, London (GB); Simon Willison, Summertown (GB); Liang-Yu Chi, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/356,759

(22) Filed: Jan. 24, 2012

(65) Prior Publication Data

US 2012/0124130 A1    May 17, 2012

Related U.S. Application Data

(63) Continuation of application No. 11/621,326, filed on Jan. 9, 2007, now Pat. No. 8,117,256.

(51) Int. Cl.
*G06F 15/16* (2006.01)
(52) U.S. Cl.
USPC .......................................................... 709/203
(58) Field of Classification Search
None
See application file for complete search history.

(56) References Cited

U.S. PATENT DOCUMENTS

| 7,353,246 | B1 * | 4/2008 | Rosen et al. | 709/202 |
| 7,752,251 | B1 * | 7/2010 | Shuster et al. | 709/200 |
| 2006/0026593 | A1 * | 2/2006 | Canning et al. | 718/100 |
| 2008/0104172 | A1 * | 5/2008 | Craig | 709/204 |

* cited by examiner

*Primary Examiner* — Scott Christensen
(74) *Attorney, Agent, or Firm* — Dentons US LLP

(57) ABSTRACT

Methods and systems are described for exploring a corpus of content items stored in one or more information repositories within a distributed communications system.

24 Claims, 14 Drawing Sheets

FIG. 12

METHODS AND SYSTEMS FOR EXPLORING A CORPUS OF CONTENT

CLAIM OF PRIORITY

This application is a continuation of and claims priority to U.S. patent application Ser. No. 11/621,326, filed on Jan. 9, 2007 now U.S. Pat. No. 8,117,256. This disclosure is hereby incorporated by reference herein in its entirety.

RELATED APPLICATIONS

The present application is related to the following U.S. patent applications:

U.S. patent application Ser. No. 11/478,291, entitled "AUGMENTING RELEVANCE RANKING BY COMMUNITY PARTICIPATION," filed on Jun. 28, 2006;

U.S. patent application Ser. No. 11/498,637, entitled "TRUST PROPAGATION THROUGH BOTH EXPLICIT AND IMPLICIT SOCIAL NETWORKS," filed on Aug. 2, 2006;

U.S. patent application Ser. No. 11/498,706, entitled "REALTIME INDEXING AND SEARCH IN LARGE, RAPIDLY CHANGING DOCUMENT COLLECTIONS," filed on Aug. 2, 2006;

U.S. patent application Ser. No. 11/498,682, entitled "USING COMMUNITY ANNOTATIONS AS ANCHORTEXT," filed on Aug. 2, 2006;

U.S. patent application Ser. No. 11/082,202, entitled "SEARCH SYSTEM AND METHODS WITH INTEGRATION OF USER ANNOTATIONS FROM A TRUST NETWORK," filed on Mar. 15, 2005;

U.S. patent application Ser. No. 11/149,323, entitled "APPARATUS AND METHOD FOR NORMALIZING USER-SELECTED KEYWORDS IN A FOLKSONOMY," filed on Jun. 8, 2005;

U.S. patent application Ser. No. 11/082,212, entitled "SEARCH SYSTEMS AND METHODS WITH INTEGRATION OF AGGREGATE USER ANNOTATIONS," filed on Mar. 15, 2005; and U.S. patent application Ser. No. 11/081,871, entitled "SYSTEMS AND METHODS FOR COLLECTING USER ANNOTATIONS," filed on Mar. 15, 2005;

the disclosures of which are herein incorporated by reference in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The present invention is directed to navigating content within a distributed communications system. More specifically, the present invention is directed to systems and methods for distributing relevant content stored in one or more information repositories to a plurality of users, as well as systems and methods for exploring or otherwise navigating the same.

BACKGROUND OF THE INVENTION

Since the advent of the global-based Internet, the hypertext transport protocol that the World Wide Web ("WWW" or "Web") utilizes has rapidly evolved as a standard protocol for information retrieval systems for distributing, discovering, and accessing content of various types. The sheer volume of content available from the Web continues to accelerate. This is due, at least in part, to the rapid proliferation of digitized images, video, and audio, and perhaps more importantly, to the increasing ubiquitous availability of the underlying Internet as a medium for accessing and exchanging content in a relatively inexpensive fashion.

It is important to be able to target Internet users in a manner that is most likely to attract their attention and encourage them to download, view, subscribe, or otherwise purchase the marketed content. From the perspective of Internet users, a Web site visitor must engage in the tedious and time-consuming process of browsing multiple sites to search for informative, entertaining or otherwise interesting content. At each site, multiple content items must be carefully sorted and analyzed, before the visitor may find an item of interest.

Therefore due to the vast and continuous growth of content available on Web sites, it has become increasingly more difficult to search for highly relevant content. This difficulty is due, at least in part, to a lack of effective tools to support targeted exploration of information repositories. For example, tagging is one tool that is useful for exploring information repositories. Generally, tagging is a process by which users assign labels in the form of keywords to contents with a purpose to share, discover, and recover the tagged content items. Discovery enables users to find new and interesting content items tagged by other users. Recovery enables a user to recall content items that were previously discovered and tagged.

Recently, an increasing number of tagging services are becoming available on the web, such as the FLICKR™ Web service, the DEL.ICIO.US™ Web service, and the MY WEB 2.0 Web service. The FLICKR™ Web service enables users to tag photos and share them with contacts or make them publicly available. The DEL.ICIO.US™ Web service allows users to tag uniform resource locators (URLs) and share tagged URLs with the public. The MY WEB 2.0 web service provides a web-scale social search engine to enable users to find, use, share and expand human knowledge. MY WEB 2.0 allows users to save and tag content items available on the Web, allowing for browsing and searching of content items, as well as sharing content items within a personalized community or with the public.

By analyzing tags associated with content items, a search engine, for example, can search across one or more combinations of tags to find specific content. Even this technique, however, produces a substantially large result set that is difficult to manage and present to a user in meaningful manner. Accordingly, Internet users need to be able to quickly filter out content (e.g., search results) that is not written or recorded in a preferred language, restricted to a preferred geographic region, consistent with local customs or regulations, or several other principles that determine the relevancy of search results.

As more content providers take advantage of the Internet, and as user expectations of Internet applications continue to grow in sophistication, conventional systems of browsing or searching for content have grown inadequate. Conventional systems lack easy-to-learn interactive user interface designs and useful navigational tools for browsing content items.

Accordingly, there is a need for an intelligent and efficient technique for browsing relevant content items from a variety of sources over one or more networks, such as the Web, using a number of disparate client devices.

BRIEF SUMMARY OF THE INVENTION

Methods and systems are described herein for collecting content items and annotations regarding the same over one or more interests, as well as providing systems and methods for navigating, exploring and discovering the content items and annotations. According to one embodiment, the invention provides a user with a context in which to share content items (and related annotations) with his or her peers according to the subject matter of the content items. Another embodiment contemplate exposing a user to new an novel content items that have been rated, reviewed or otherwise annotates by his or her peers. A third embodiment provides users with systems and methods to create a resource of content items that a user may browse on the basis of topicality or quality. An annotation, as used herein, may comprise any information regarding a given content item, e.g., a number of times users save the given content item, votes that the given content item is interesting, comments or commentary regarding the given content item, information regarding the given content item itself, etc.

Systems and methods according to embodiments of the present invention are operative to save content items and related annotations in accordance with one or more interests to which the content item and related annotations belong. Accordingly, a mechanism is provided to draw the attention of users to new content items that become available for the one or more interests. Providing content items and related annotations according to one or more interests to which the content item and related annotation belong allows individuals to share content items that they discover to provide their peers with a growing source of information regarding a given interest.

Other embodiments of systems and methods in accordance with the present invention provide for the navigation and visualization of a corpus of content items and any related annotations, which may be organized according to one or more interests to which a given content item belongs. A given content item may include web pages, text, images, video, audio, television programming, webcast information, or the like. Organization and visualization of content items within a given interest may take into account the time since which a user provides given content item, the number of users providing the given content item, whether users vote for a content item as interesting (which may include explicit and implicit votes that a content item is interesting), etc.

BRIEF DESCRIPTION OF THE DRAWINGS

The invention is illustrated in the figures of the accompanying drawings, which are meant to be exemplary and not limiting, in which like reference numbers indicate identical or functionally similar elements, additionally in which the left-most digit(s) of a reference number identifies the drawing in which the reference number first appears, and in which:

FIG. 12 presents a screen diagram illustrating an interface for a search page according to one embodiment of the present invention;

DETAILED DESCRIPTION OF THE PREFERRED EMBODIMENTS

In the following description of embodiments of the invention, reference is made to the accompanying drawings that form a part hereof and in which is shown by way of illustration a number of specific embodiments in which the invention may be practiced. It is to be understood that other embodiments may be utilized and structural changes may be made without departing from the scope of the present invention.

Methods and systems are described herein for collecting content items and annotations regarding the same over one or more interests, as well as providing systems and methods for navigating, exploring and discovering the content items and annotations located at one or more local and remote information repositories throughout a widely distributed communications system, such as the global-based Internet. The available content items include images, video, audio, television programming, shared photograph albums, webcasts, movies, sporting events, musical performances, radio broadcasts, news reports, infomercials, online games, weblogs, or other forms of on-demand, unicast, multicast, or broadcast media or multimedia. As described in greater detail below, tags or other classification mechanisms may be analyzed to reduce an initial corpus to a smaller, more relevant collection of content items. Applying specific user or market preferences, a customizable navigational guide may be produced to provide a personalized view of content items and to enable efficient access to content matching specified relevancy and interest standards.

Figure 1:
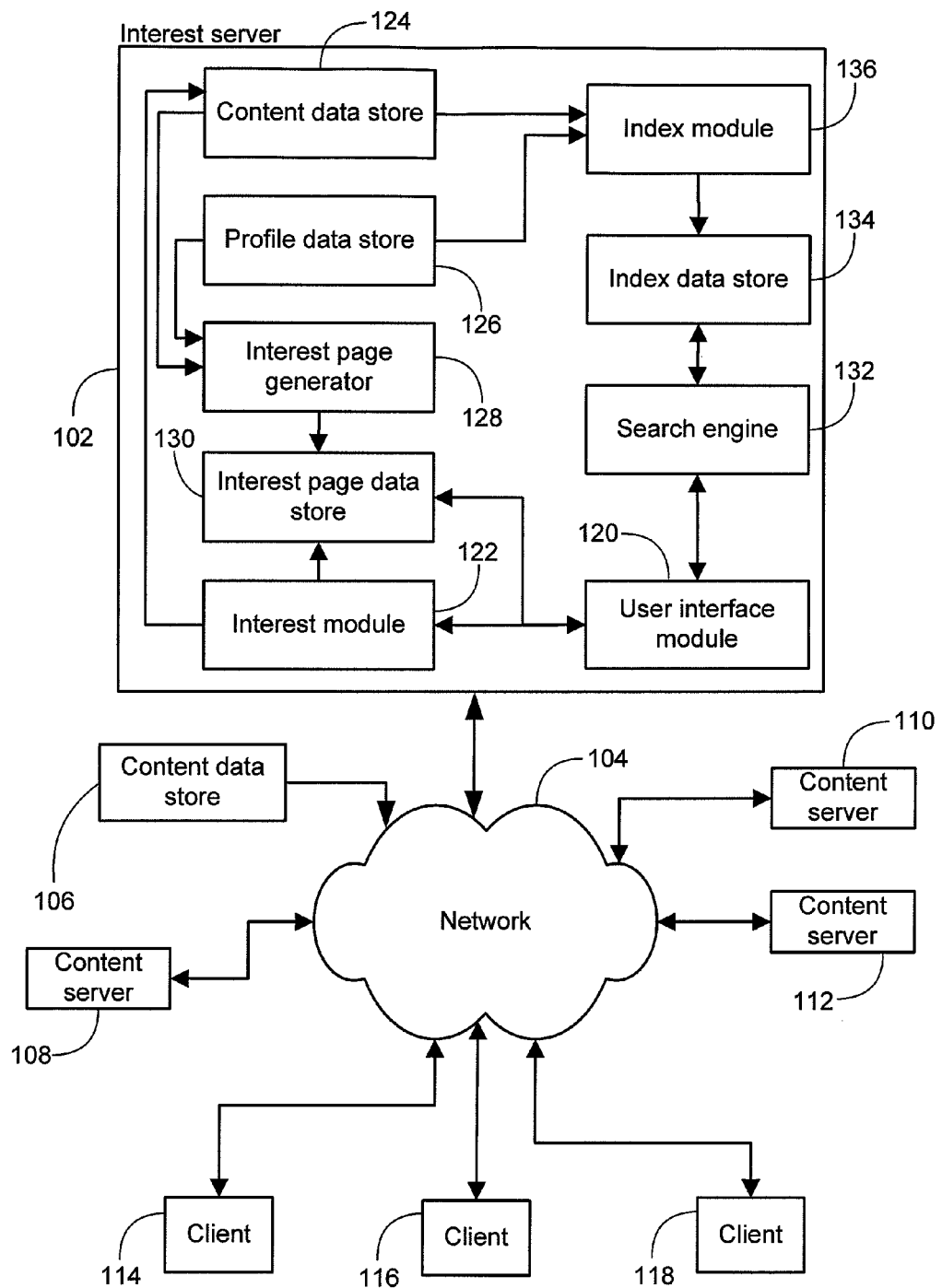
FIG. 1 illustrates a system for collecting content items and annotations regarding the same over one or more interests, as well as providing systems and methods for navigating, exploring and discovering the content items and annotations according to one embodiment of the present invention.

FIG. 1 illustrates a system for exploring a corpus of content item according to one embodiment of the invention. According to FIG. 1, the exemplary embodiment comprises an interest server 102, one or more content servers 108, 110 and 112 and one or more client devices 114, 116 and 118 in communication over a network 104. The network 104 may comprise any combination of local and wide area networks over both wired and wireless infrastructure, for example, the Internet. The network 104 provider a communications medium over which the interest server 102, content servers 108, 110 and 112 and client devices 114, 116 and 118 may transmit and receive data.

According to one embodiment of the invention, a client device 114, 116 and 118 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A user of a client device 114, 116, and 118 communicatively coupled to the network 104 may access a variety of content items at content servers 108, 110, and 112 available on the network 104 through use of a browser (not pictured) installed upon a given client device 114, 116, and 118. For example, a user of a client device 114, 116, and 118 may direct a browser installed upon the client device 114, 116, and 118 to access a given uniform resource locator ("URL") that identifies a location of a content item. The content item at the URL that the browser 142 accesses may comprise content items including, but not limited to, a website, an audio file, a video file, an image, a web page, document, etc.

In addition to directly accessing content items available at the one or more content servers 108, 110 and 112, a given client device 114, 116, and 118 may communicate with the interest server 102 over the network 104 to browse or otherwise navigate a corpus of content items on a per-interest basis. According to one embodiment, the interest server comprises a number of software modules including, but not limited to, a user interface module 120, an interest module 122, an interest page generator 128, an index module 136 and a search engine module 132. Additional, the interest server 102 may comprise a number of data stores for the persistent storage of data that is of relevance to the interest server 102 including, but not limited to, an interest page data store 130, a profile data store 126, a content data store 124 and an index data store 134. The interest server may also be in communication with one or more remote content data store 106. A given data store that the system utilizes may include, but is not limited to, a flat file data structure (comma or tab delimited value file), a relational database, an object-oriented database, a hybrid object-relational database, etc.

A user wishing to access the functionality of the interest server 102 may create an account with the interest server 102 to browse or otherwise navigate a corpus of content items that are relevant to a given interest. It should be noted that the creation of an account is not a prerequisite for a given user to browse or otherwise navigate the corpus of content items, or links thereto, that the interest server 102 maintains. The user utilizes a given client device 114, 116 and 118 to initiate a connection over the network to the interest server 102. The user interface module 120 at the interest server 102 may transmit a home page for the interest server 102 to the client device 114, 116 and 118 through which the user may select a control to generate an account. Selection of a control in the user interface to generate an account invokes business logic at the interest module 122 to begin the account generation process.

According to one embodiment, the user interface 120 prompts the user to provide or otherwise identify one or more topics in which the user has an interest. Using a given client device 114, 116 and 118, the user supplies keywords that indicate the topics in which he or she has an interest. As is explained in greater detail herein, the user interface module 120 transmits the keywords that the user supplies to the interest module 122, which performs a check of a given interest page (which the interest page data store 130 may maintain) that is associated with a given keyword to determine an activity level for the given interest page.

In order to allow users to agree upon one or more appropriate interests with which to share content items, as well as to suppress the proliferation of multiple interests for sharing content items with similar subjects, the system provides users with an activity level of a given interest, which according to one embodiment is a measure of the amount of content that users are providing to a given interest. Accordingly, the interest module 122 may pass the activity level for a given page to the user interface module 120 for display on the client device 115, 116 and 118. Where the activity level for a given interest page in low, the interest module 122 may determine one or more related interests with a higher activity level. The user interface 120 transmits the one or more related interests to the client device 114, 116 and 118, which may also include an activity level for a given related interest.

Topics that the user identifies as interests interest are written to a profile for the user at the profile data store 126. The profile data store 126 stores information regarding one or more registered users on a per-user basis. Accordingly, the profile for a given user identifies information regarding the interests of the given user, and may also comprise personal information regarding the given user. As is explained in greater detail herein, a profile at the profile data store 126 may also maintain information regarding content items that the user has ranked or otherwise commented upon, content items that the user provides to the interest server 102, and the interests pages with which the user shares a given content item.

When a given registered user accesses the interest server, the user interface module 120 may present the user with a "dashboard" of his or her interests. According to one embodiment, the interest module 122 accesses information regarding the interests of the given user that the profile data store 126 maintains. On the basis of the interest of the user, the interest module 122 retrieves an interest page that corresponds to a given interest of the user. The user interface module 120 may provide a unified interface to the one or more interest pages, for example, though a tabbed interface wherein a given tab corresponding to a given interest, thereby allowing the user to quickly navigate between interest pages. The dashboard that the user interface module 120 provides may also comprise summary information regarding the interests of the given user. For example, the dashboard may comprise links to a selection of the most popular content items from the interests of a given user. Alternatively, or in conjunction with the foregoing, the user interface module 120 may generate a dashboard that comprises one or more links to the newest content items from the interests of the given user.

The user may access an interest page for a given interest, which the user may select from the dashboard or other interface that the user interface component 120 provides. According to one embodiment, an interest page for a given interest comprises links to content items that are relevant to the given interest. A user may submit one or more links to content items that he or she believes is relevant to a given interest for storage in a content data store 124. The content data store 124 may maintain a link to a given content item, a cached copy of the given content item, as well as combinations thereof (collectively referred to herein as content items). When the user submits a content item to the interest server 102 through an interface that the user interface module 120 provides, the content data store 124 may maintain the content item in conjunction with information regarding one or more interests with which the content item is associated. The profile for the user at the profile at the profile data store 126 may also maintain information regarding the content item that the user provides to the interest server 102.

On a periodic basis, the interest page generator 128 identifies content items at the content data store 124 that users indicate are associated with a given interest. The interest page generator 128 produces an interest page for the given interest that comprises one or more of the content items that users indicate are associated with the given interest. The interest page data store 130 maintains data regarding the interest pages, e.g., the content items that are responsive to a given interest. Accordingly, as the number of content items that uses provide for a given interest increases, the interest page that the interest page generator 128 produces comprises an increasing number of content items. The interest page generator 128 may also provide an indication of the user who supplied the content item to the interest, which may also comprise a link to a personal page for the user. It should be noted by those of skill in the art that the interest page generator 128 may generate a given interest page in real-time or otherwise in response to a request for the given interest page from the user, as opposed to pre-generating the given interest page for persistent storage at the interest page data store 130.

When the user interface module 120 transmits an interest page to a given client 114, 116 and 118, the user interface that the interest page provides may comprise an "interesting" control. The interesting control allows users within a given interest, as represented by the interest page for the given interest, to specify those content items within an interest page that the user finds interesting. Selection of the interesting control by the user may invoke computer code or other business logic at the interest module 122 to write an indication of the event to the content data store 125 in conjunction with information regarding the content item. For example, where the user selects an interesting control to indicate that a given content item is interesting, the interest server 102 maintains an indication of this event, which the interest module 122 may write to the content data store 124. Additionally, the interest module 122 may write an indication of the event to the profile for the given user that the profile data store 126 maintains.

Content items that the interest page generator 128 includes on a given interest page may change as a function time or activity. According to one embodiment, a given interest page comprises a number of content items below a threshold and that as the number of content items associated with the given interest page exceeds the threshold, content items are removed from the interest page, which may accordingly be viewed as a FIFO with a number of positions in the queue equal to the threshold value. Alternatively, the content items that interest page generator 128 includes on a given interest page is a function of time and activity, whereby content items that users identify as interesting remain on the interest page longer than those content items that users do not deem interesting. The interest page generator 128 may utilize a ranking function with time and number of votes as input, outputting a score whereby the score is decreases the longer a content item is on a given interest page and increases as users identify the content item as interesting. Those content items with scores that exceed a threshold remain on the interest page. Those of skill in the art recognize that other functions and techniques for limiting the number of content items that the user interface module 120 displays on a given interest page as well as how long to display a content item on a given interest page.

In addition to providing content items to the interest server 102 and identifying interesting content items within a given interest, the user interface module 120 also provides controls to allow a user to propagate content items among one or more interest pages. Propagating a content items between one or more interest pages may be done when the use provides a content item to the interest server 102, or may be done as the user is browsing content items within a given interest page. According to one embodiment, when a user identifies a given content item as interesting, the user interface provides a control (e.g., text entry box) that allows the user to identify other interest pages to which the content item is relevant. For example, where the user is identifying a content item regarding the Sun on an interest page devoted to physics, the user may also indicate that the content item is relevant to astronomy and solar energy, thereby propagating the content item to those interest pages. The interest module 122 receives the indication of other relevant interest pages for the content item from the user via the user interface module 120, which the interest module 122 writes to the content data store 124 in association with the content item that the user identifies.

An interest page for a given interest may also indicate one or more related interests. According to one embodiment, a given interest may be thought of as a "tag" or keyword that describes the content items that are associated with a given interest or interest page. Given an initial input tag, the interest page generator 128 may identify other related interests. As an interest may be thought of as a tag, the interest page generator 128 may utilize tag recommendation systems to identify related interests. U.S. patent application Ser. No. 11/503,051, entitled "SYSTEM AND METHOD FOR PROVIDING TAG-BASED RELEVANCE RECOMMENDATIONS OF BOOKMARKS IN A BOOKMARK AND TAG DATABASE," filed on Aug. 11, 2006, the disclosure of which is hereby incorporated by reference herein in its entirety, describes one exemplary tag recommendation system that the interest page generator 128 may utilize. Clustering algorithms that are know to those of skill in the art may also be utilized to identify related interests, for example, U.S. Pat. No. 7,051,023, entitled "SYSTEMS AND METHODS FOR GENERATING CONCEPT UNITS FROM SEARCH QUERIES," the disclosure of which is hereby incorporated by reference herein in its entirety. The interest page generator 128 may also determine an activity level for a given one of the one or more related interests, which the user interface component 120 may transmit to a client device 114, 116 an 118 for presentation to the user.

According to one embodiment of the invention, the interest page generator 128 utilizes a controlled vocabulary in conjunction with the interest folksonomy that users create. Using one or more trusted sources, such as an encyclopedia (e.g., wikipedia), thesaurus, dictionary, etc., it is possible to discover or otherwise identify terms or concepts that have a relationship with a given interest. For example, where the given interest is "fish," an encyclopedia may indicate the terms "animal, ocean, astrology (Pisces), food (sushi), etc, are related to the term fish. The interest page generator 128 may identify these terms as related interest to the interest "fish." According to one embodiment, the interest page generator 128 may use terms (interests) from the controlled vocabulary to influence a set of one or more related interests such that interests in common between the folksonomy and the controlled vocabulary are presented more prominently or otherwise weighted heavier than those interests that do not appear in the controlled vocabulary. Alternatively, or in conjunction with the foregoing, the user interface module 120 may display related interests from the controlled vocabulary apart or otherwise distinct from related interests from the folksonomy.

The interest page generator 128 may also use controlled vocabulary to display zeitgeists. For example, where the interest page generator 128 has access to a controlled vocabulary of the most common sports names, the interest page generator 128 may run the interests from the controlled vocabulary against interests associated with content items in the content item data store 124 to identify the most active sports interest pages for user to explore in greater depth. The interest page generator 128 may produce zeitgeists for any interest that is relatively unambiguous as is understood by those of skill in the art, for example, a zeitgeist of companies that have been saved the most to one or more interests, capitals of the world, states in the United State, countries, etc. The user interface module 120 may transmit this zeitgeist information to a client 114, 116 and 118 for display on the dashboard, a given interest page and combinations thereof.

In addition to the foregoing, the interest page generator 128 may also indicate one or more featured content items on an interest page for a given interest. According to one embodiment, the interest page generator 128 identifies a content item as a featured item by identifying the saved content items associated with a given interest, which may be made on a per-URL basis and may be limited to canonical URLs. The interest page generator 128 may eliminate those content items that were previously featured content items and organize the content items by the most saves, identifying those content items above a threshold as featured content items, e.g., the top five content items. Alternatively, or in conjunction with the following, the interest page generator may utilize the number of users who identify a content item as an interesting content item to identify a featured content item.

Featured content items may be identified over one or more time windows, e.g., hourly, daily, weekly, etc. The interest page generator 128 may indicate in the content data store 124 in conjunction with a given content item that the given content item was a featured content item in a given interest and the date on which the content item was identified as a featured content item. Because the interest page generator 128 has access to date information with regard to a given content item, the date based archives of featured content items for a given interest may be provided to the user. For example, where the interest page generator 128 implements month based archiving of featured content items, the user interface module 120 may provide the use with links to featured content items by month whereby the user selects a link for a given month which causes the user interface module 120 to retrieve the appropriate monthly archive for transmission to a given client device 114, 116 and 118. Alternatively, the interest page generator 128 may receive a request for a monthly archive for a given month for a given interest, query the content data store 124 to retrieve the responsive featured content items, and pass the featured content items to the user interface module 120 for transmission over the network 104 to the requesting client 114, 116 and 118.

The system of the present embodiment is also operative to build a directory on the basis of user interaction with the system. According to one embodiment, a directory of resources may be created by the interest module 122 observing the manner in which users are saving content items to given interests. For example, a content item, or cluster of related content items, that has very few or no saves over a period of time under a given interest, followed by a surge or spike in saves of the content to the interest and a subsequent gradual decline typically represents a news story or an item of topical interest. Conversely, a content item, or cluster of related content items, which users save to a given interest at a relatively stable rate as a function of time, may represent a resource, e.g., a reference web site such as a given wikipedia page or a movie database such as IMDB®. The program code or other business logic at the interest module 122 may analyze these data to identify one or more resources within a given interest. The interest module 122 may identify resources within a given interest to the user interface module 120 for transmission over the network 104 to a given client 114, 116 and 118. Alternatively, the interest module 122 may identify a resource for a given interest and write an indication to the interest page data store 130.

As indicated above, users at a client device 114, 116 and 118 may save a content item to the interest sever 102, as well as marking or otherwise identifying interesting content items associated with a given interest. On the basis of combinations of the foregoing events, the interest module 122 may identify a given user as an expert with regard to a given interest. According to one embodiment, the interest module 122 identifies experts on the basis of a point system. When a given user introduces or otherwise shares a content item (e.g., saves) to a given interest for storage in the content data store 124, the interest module 122 may award the given user one or more points. As other users vote or otherwise identify the content item that the given user introduces, interest module 122 awards the user additional points, e.g., one or more points when another user indicates that the content item is an interesting content item. When a user amasses a number of points that exceeds a threshold, the interest module 122 may identify the given user as an expert for the given interest. The interest module 122 may also provide for functionality that allows points to decay over time, e.g., the given user looses one or more points a week, thereby encouraging users to continue to introduce content items to the interest sever, as well as content items that other users who share the interest find interesting.

According to an alternative embodiment, the interest module 122 may select a certain number of users who introduce the greatest number of content items to a given interest, e.g., top three contributors to a given interest. Similarly, the interest module may select a certain number of users who introduce content item that garner a certain number of votes that the content items they provide are interesting, e.g., top three vote earners. Still further, the interest module 122 may determine the expert status of the user as a function of combinations of the foregoing, e.g., number of content items that the user introduces weighted by the number of interestingness votes. According to another embodiment, a given user may manually identify one or more other users as experts in one or more subjects. The number of users who designate a given user as an expert may influence whether the system identifies the given user as an expert.

Regardless of the specific technique that the system uses to determine that a user is an expert, the interest module 122 writes an indication of the expert designation of the user in a user profile for the user at the profile data store 126, which may comprise an indication of the specific interest in which the user is an expert.

Because the profile data store maintains information regarding the expert status of a user in one or more interests, as well as the content items that the user provides (which the content data store 124 maintains), the interest page generator 128 may be operative to generate expert pages. The user interface 120 may transmit expert pages over the network to a requesting client device 114, 116 and 118. According to one embodiment, an expert page comprise content items that the user has introduced to the system across one or more of the interest of the user, regardless of whether the user is an expert in all of his or her interests. Alternatively, the expert page that the interest page generator 128 produces identifies one or more content items that the users introduces to the interest in which the user is an expert. Similarly, the interest page generator 128 may generate one or more expert pages on the basis of the one or more interests such that the expert interest page comprises content items that the experts for the interest provide to the interest, e.g., a fishing expert interest page that contains links to content items from experts in the fishing interest.

In addition to expert pages, a given user may access his or her personal page. When a user requests to view his or her personal page, which may be accomplished via the user interface module 120, the user interface module may retrieve the personal page for the user from the interest page data store 130 and transmit the personal page over the network 104 to the requesting client device 114, 116 and 118. The interest page generator 128 may identify the user (e.g., through the use of a user identifier) and collect one or more content items from the content data store 124 with which the user is associated. The interest page generator 128 writes these data as a personal page, which the interest page data store 130 maintains.

The interest page generator 128 may also produce community pages in addition to interest pages, expert pages and personal pages. According to one embodiment, a community page is similar to an interest page except the interest is a community, as opposed to a specific interest. A user may interact with the user interface module 120 to provide content items to the interest module 122 for inclusion on the community page, as well as vote or otherwise indicate those content items that the user finds interesting. The community page may be identical to the interest page in all other respects.

The interest server 102 comprises a search engine 132 that allows users to conduct keyword searches for content items that the interest server 102 maintains at the content data store 124 and the interest page data store 130. An index module 136 is in communication with the content data store 124 and may also be in communication with the profile data store 126, thereby providing the index module 136 with access to both content and profile information, respectively. The index module 136 is operative to parse the information that the content data store 124 and the profile data store 126 maintain to generate an index for storage in the index data store 134. According to one embodiment, the index is an index of word-location pairs such that the search engine may locate one or more content items that comprise a given word through reference to the word in the index. Exemplary methods for indexing information are described in commonly owned U.S. Pat. No. 5,745,889, entitled "METHOD FOR PARSING INFORMATION OF DATABASE RECORDS USING WORD-LOCATION PAIRS AND METAWORD-LOCATION PAIRS," the disclosure of which is hereby incorporated by reference in its entirety.

A user may locate one or more content items by accessing the search engine 132 through an interface that the user interface module 120 provides. Using the user interface, the user provides one or more terms or phrases to the search engine 132. The search engine 132 receives the one or more terms or phrases and conducts a search of the index at the index data store 134 to identify content items that are responsive to the user search. According to one embodiment, the search engine 132 provides a result set comprising zero or more content items that are responsive to the search, which the user interface component 120 may properly format for transmission over the network 104 and display on a client device 114, 116 and 118.

The result set that the search engine 132 generates may comprise content items from the content data store 124 that are responsive to the user search. The search engine 132 may also identify one or more interests to which the content items belong. Because the index component 136 may also index one or more user profiles that the profile data store 126 maintains, the search engine 132 may also search across user profile information for inclusion of information from responsive profiles in a given result set. Accordingly, the search engine 132 may search over and provide a result set that comprises information regarding one or more interests, content items and user profiles.

Figure 2:
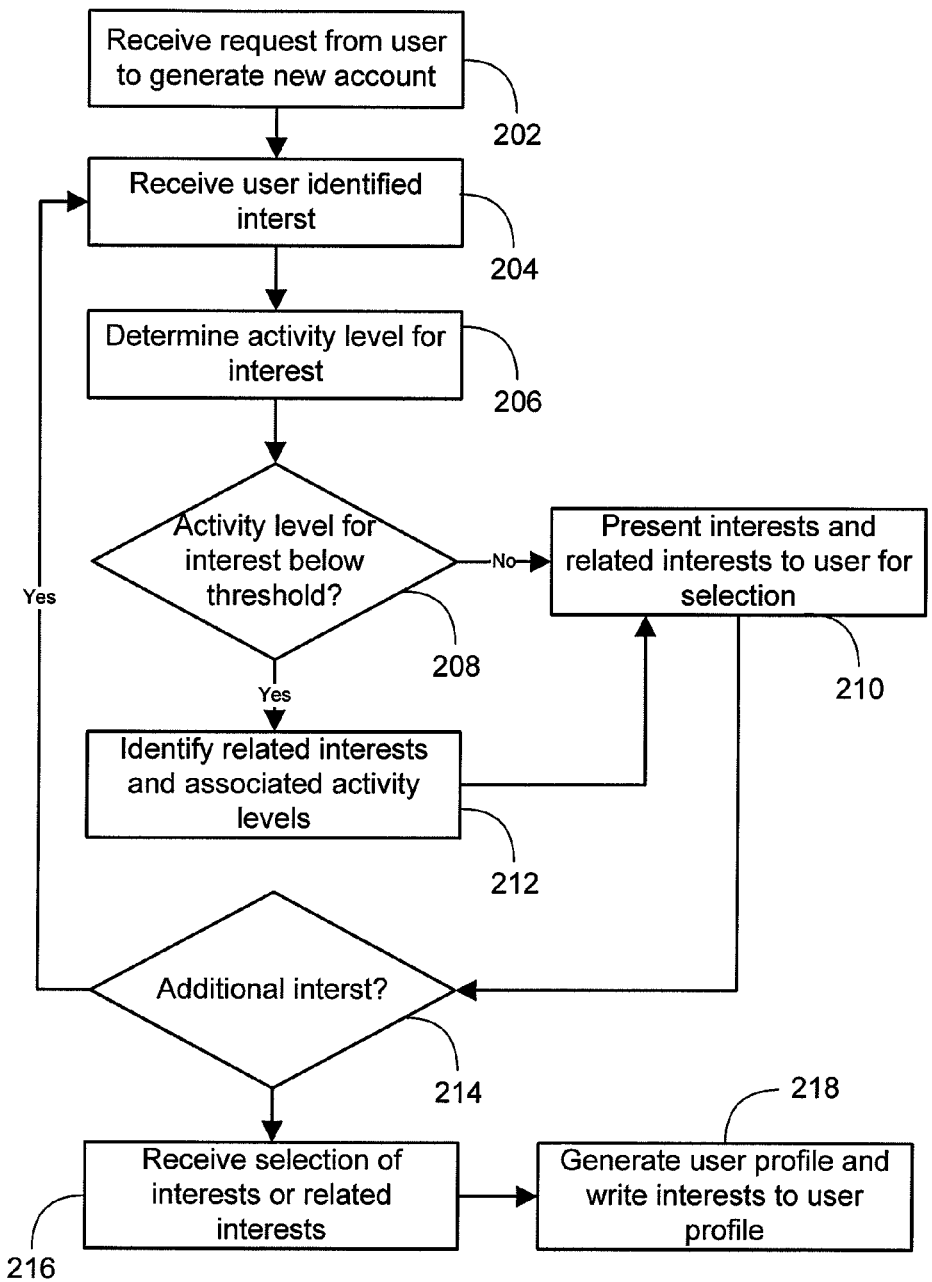
FIG. 2 presents a flow diagram illustrating a method for registering one or more interests according to one embodiment of the present invention.

FIG. 2 presents a flow diagram that illustrates a method for registering one or more interests with an interest server according to one embodiment of the present invention. According to the embodiment of FIG. 2, the process begins with the receipt of a request from a user to generate a new account, step 202. For example, the user may interact with the user interface module at the interest server to supply user identification and other demographic information that describes the user. The user also identifies one or more interests, step 204, which the interest server may receive from the user.

The interest server determines the activity level of a given interest from among the one or more interests that the interest server receives from the user, step 206. According to one embodiment, an interest module at the interest server queries a content data store to determine the amount of activity in the given interest as a function of the number or amount of content items associated with the given interest, which the interest module may also determine as a function of time. The interest server also executes a check to determine if the activity level for the interest falls below a threshold, step 208.

Where the activity level for the given interest falls below a threshold, step 208, for example, the interest module determines that the activity level for the given interest is very quiet, the interest module, or other program code at the interest server may identify one or more related interests and an activity level associated with a given one of the one or more related interests, step 212. Regardless of whether the activity level for the given interest falls below the threshold, the interest server presets the user with the given interest and activity level for the given interest, as well as any related interests and associated activity levels, step 210.

The interest server performs a check to determine if the user provides an additional interest, step 214. If the check at step 214 evaluates to true, program flow returns to step 204 and the process repeats. Where the interest server completes processing of the interests that it receives from the user, the user selects one or more of the interests or related interest that the interest server provides, step 216. For example, a first interest may have an activity level of "very active" whereas a second interest has an activity level of "very quiet." According to the present embodiment, the interest server may identify a related interest that is related to the second interest and has an activity level of "active," allowing the user to select from among the one or more interest or related interests. The interest server may generate a user profile for the user and write the interests or related interests that the user selects to the user profile for persistent storage of the user's interests, step 218.

Figure 3:
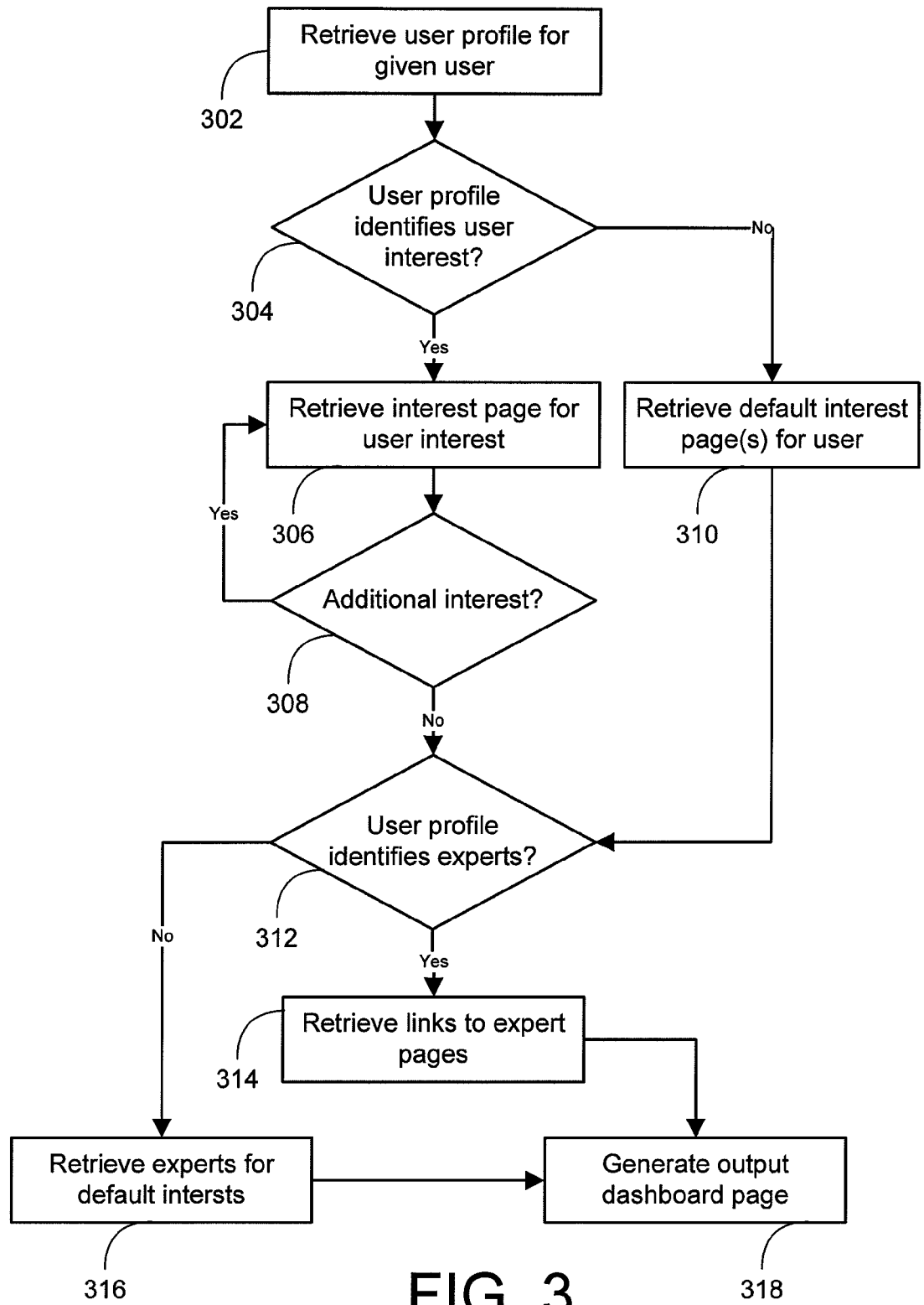
FIG. 3 presents a flow diagram illustrating a method for providing a dashboard for the navigation of one or more registered interests according to one embodiment of the present invention.

A users registers with the interest sever, which is operative to provide the user with a portal through which the user may navigate to his or her interests, referred to herein as a "dashboard." FIG. 3 illustrates a method for generating a dashboard comprising one or more interests of a given user according to one embodiment of the present invention. The process of FIG. 3 begins with the interest server retrieving the user profile for the given user, step 302. The interest server executes a check to determine if the user profile for the given user identifies one or more interests of the given user, step 304. Where the user does not indicate any interests in his or her user profile, the interest server may identify one or more default interest pages for the given user, step 310. The interest server may select the default interest pages a random. Alternatively, or in conjunction with the foregoing, the interest server may select the default interest pages on the basis of demographic information from the user profile, user communities to which the given user belongs, users that are related to the given user in a social network, etc., including combinations thereof.

Where the user profile for the given user identifies one or more interests for the given user, the interest server retrieves an interest page that the user profile identifies, step 306. A check is performed to determine if the user profile identifies one or more additional interests, step 308. Where the check evaluates to true, the interest server retrieves an interest page for a subsequent interest that the user profile identifies, step 306.

The interest server may also determine if the user profile for the given user identifies any experts, step 312. Alternatively, or in conjunction with the foregoing, the interest server may determine if there are any experts associated with the one or more interests of the given user. Where the given user identifies one or more experts, the interest server may retrieve or generate a link to a page for a given expert, step 314. Similarly, where the user identifies neither interests, step 304, nor experts, step 312, the interest server may retrieve or generate one or more links to one or more corresponding expert pages for default experts, step 316. Alternatively, the interest sever may retrieve or generate links to one or more expert pages for experts associated with the default interest pages. The interest server generates an output dashboard page comprising the one or more interest pages that the user identifies in his or her profile (or default interest pages), as well as any related experts, step 318. According to one embodiment, the output dashboard, or a page for a given expert, identifies one or more content items the expert provides.

Figure 4:
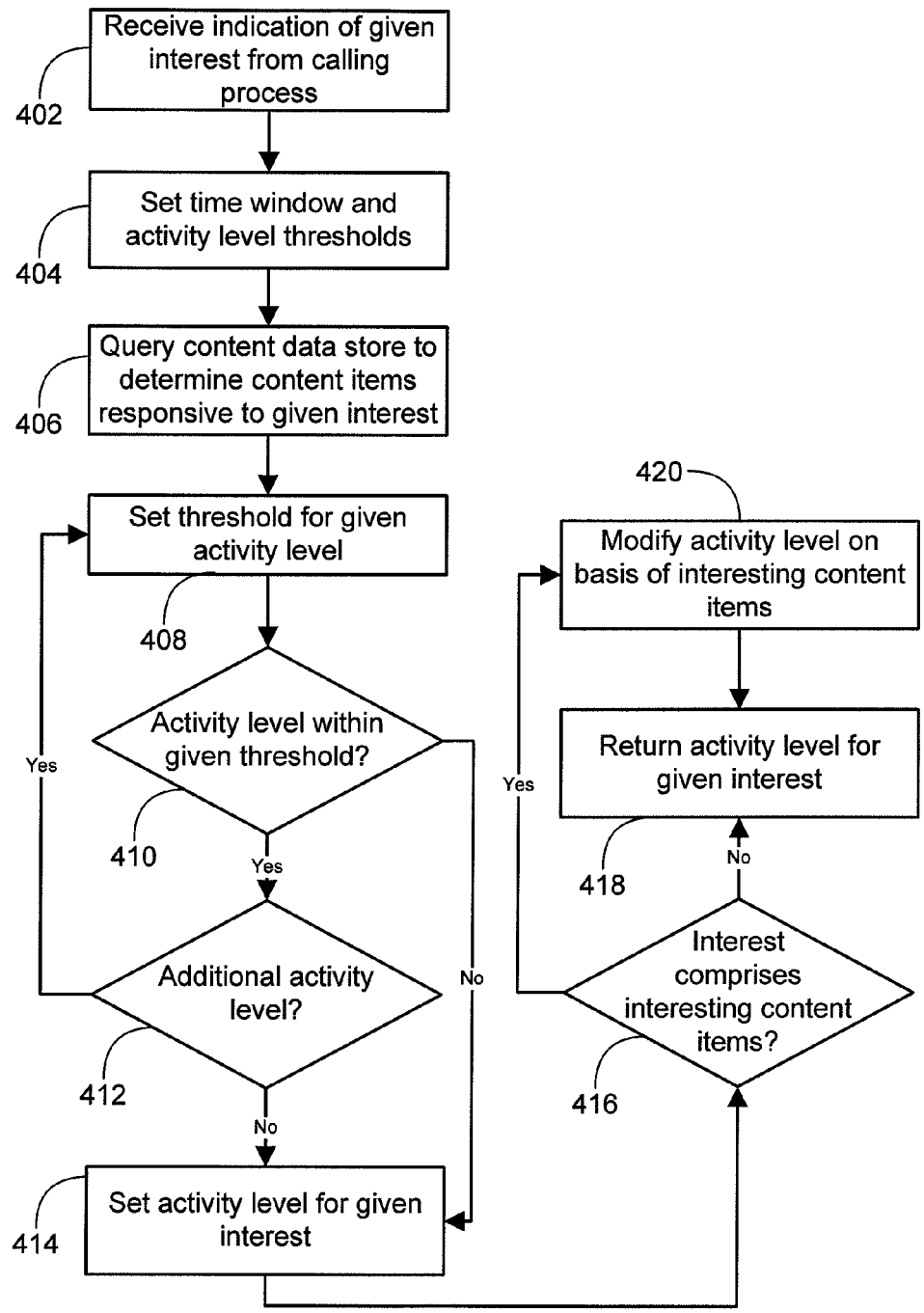
FIG. 4 presents a flow diagram illustrating a method for determining an activity level for a given interest according to one embodiment of the present invention.

As the process of FIG. 2 indicates, the interest sever may be operative to determine an activity level for a given interest that the interest server is hosting, which the interest server may also provide as part of the output dashboard page of FIG. 3. FIG. 4 illustrates one embodiment of a method for determining an activity level for a given interest. The process of FIG. 4 begins with the receipt of an indication of a given interest from a calling process, step 402, e.g., a process that requires an activity level for a given interest to display to the user or to perform a check or other computation. The interest server sets a time window and a plurality of activity level thresholds, a given activity level threshold identifying criteria for assigning a given activity level to a given interest, step 404.

The content data store is queried to determine content items that are responsive to the given interest, step 406. For example, the query may return a result set that comprises one or more records, a given record identifying details of a content item that is associated with the given interest. The interest server uses the result set to determine the activity level of the given interest. A first activity level threshold is selected from among the plurality of activity level thresholds, step 408, a check is performed to determine if the activity level (represented by the number of content items associated with the given interest) falls within the threshold, step 410. Where the activity level is within the threshold, the interest server sets the activity level for the given interest to an activity level associated with the threshold, step 414. Where the activity level is not within the current activity level threshold, step 410, an additional check determines if additional activity level thresholds exist, step 412. Where the check at step 412 evaluates to true, program flow returns to step 408 with the selection of a subsequent activity level threshold. Where the check at step 412 evaluates to false, the interest sever associates the given interest with the current activity level, step 414.

The process of FIG. 4 continues with the execution of a check to determine if any content items associated with the given interest are interesting content items, step 416. Where the given interest comprises one or more interesting content items, the interest server may boost or otherwise modify the activity level on the basis of the presence of the interesting content items, step 420. Regardless of the output of the check at step 416, program flow continues with the return of an activity level for the given interest, step 418, which the calling process may receive.

Figure 5:
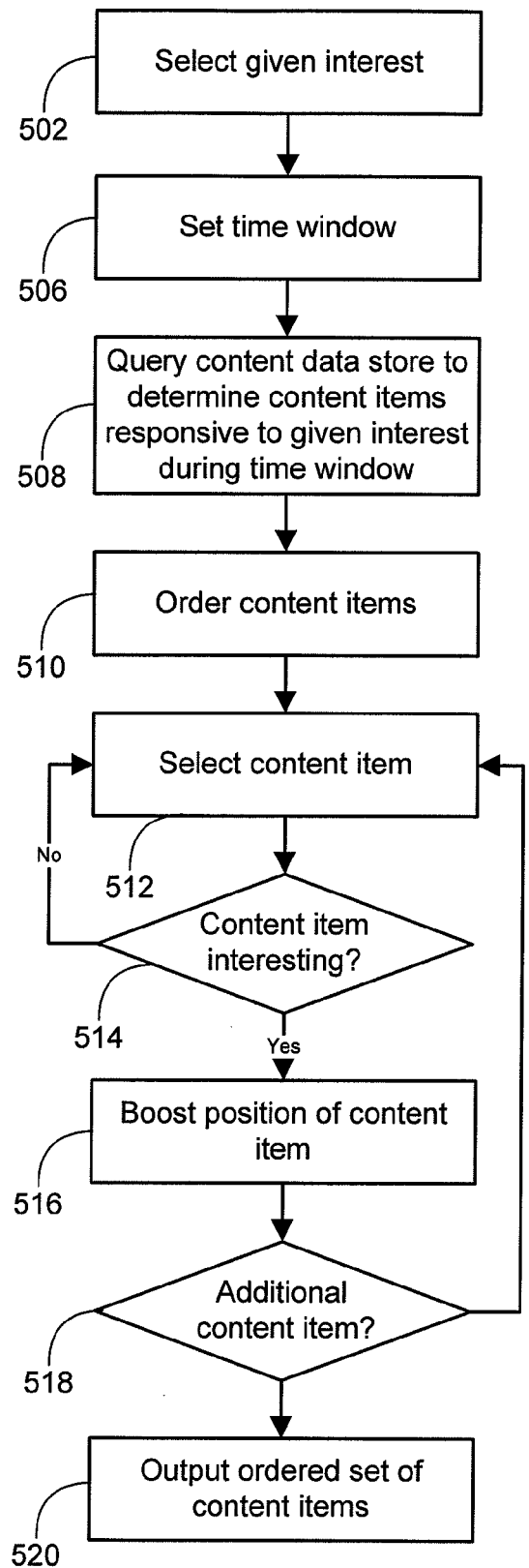
FIG. 5 presents a flow diagram illustrating a method for generating an interest page for a given interest according to one embodiment of the present invention.

Embodiments of the present invention utilize one or more interest pages to organize content items that are directed towards a respective given interest. FIG. 5 illustrates one embodiment of a method for generating an interest page that begins with the selection of a given interest, step 502. A time window is set, e.g., an hour, a day, a month, a year, for the given interest, step 506. According to one embodiment, the time window may be set as a function of the activity of the interest. For example, an interest that has a "hectic" activity may have a short time window as opposed to an interest that is quiet, resulting the hectic interest. Alternatively, or in conjunction with a time window, a threshold may be set on the basis of a count of a number of items users are saving to the interest.

Program code at the interest server issues a query to the content data store to determine a set of zero or more content items that are responsive to the given interest during the time window, step 508, which may also include respective annotations for one or more of the content items. The content items are ordered, step 510, which may be in accordance with a time at which a user provides a given content item to the given interest. A given content item is selected from the set, step 512, and a check is performed to determine if the content item is an interesting content item, step 514. Where the content item is not interesting, the method selects a subsequent given content item, step 512. Where the content item is interesting, step 514, the position of the content item in the set may be boosted, step 516. For example, a given content item that has been saved a number of times or receives a number of votes as to the interestingness of the content item, the position of the content item in the list may be increased.

The method also performs a check to determine if there are additional content items in the set that require processing, step 518. Where there are additional content items that require processing, program flow returns to step 512 with the selection of a subsequent content item for processing. Where no further content items exist in the set of content items that require processing, the ordered set of content items is output as an interest page for the given interest, step 520. It should be noted, as other embodiments of the invention illustrate, that a given interest page may comprise additional information regarding the interest, such as information regarding and content items from experts for the given interest, etc.

Figure 6:
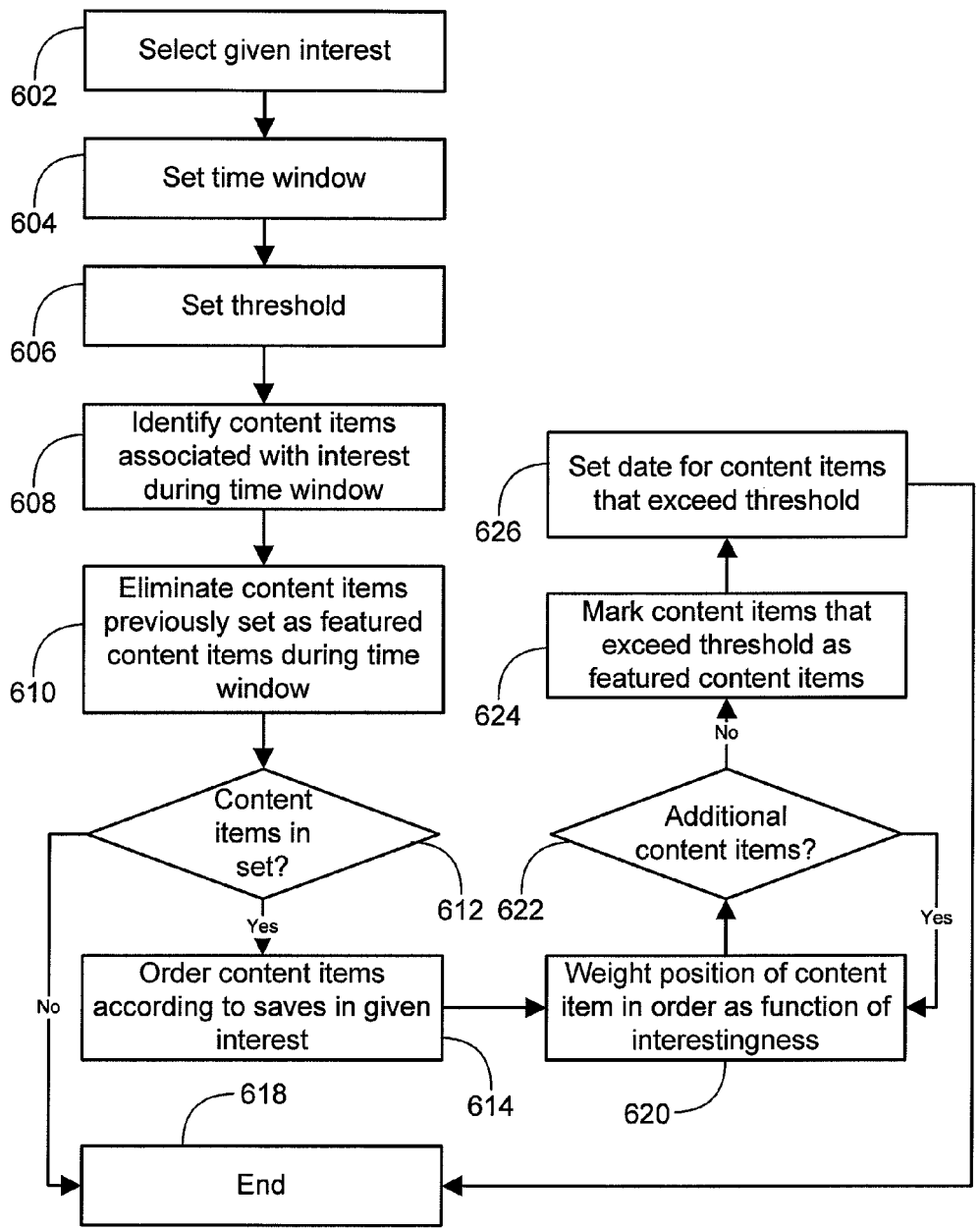
FIG. 6 presents a flow diagram illustrating a method for determining featured content items for a given interest and generating an archive according to one embodiment of the present invention.

Certain content items that are part of an interest page may be featured content items. FIG. 6 illustrates one embodiment of a method for determining featured content items for a given interest, which may enable the generation of an archive. The process of determining whether a given content item is a featured content item begins with the selection of a given interest, step 602. Additionally, a time window is set and a threshold is set, steps 604 and 606, respectively. According to one embodiment, the threshold may be set in accordance with an activity level for a given interest, such that the number of featured links goes up as activity increases. The method continues with the identification of contents items that have been associated with the given interest during the time window, step 608, and the elimination of content items previously set as featured content items during the time window, step 610.

The interest server performs a check to determine if there are any content items in the set, step 612, e.g., to determine if the result set is null or otherwise empty. Where the set of content items is empty, the process terminates, step 618. Provided that there are content items in the set, step 612, the interest server orders the content items, which may comprise in accordance with the number of saves of the content item in conjunction with the given interest, step 614. The position of a given content item in the order may be weighted as a function of interestingness, step 620. According to one embodiment, the more users that identify a given content item as an interesting content item, the greater that weight that the interest server applies. The interest server applies the weighting for the one or more content items in the set, steps 620 and 622.

As indicated at step 606, process of FIG. 6 sets a threshold to identify those content items that are featured content items, which in the exemplary embodiment is a rank or position in the ordered set of content items. Accordingly, the interest server marks those content items that exceed the threshold as featured content items for the given interest, step 624, e.g., the top three content items. The interest server writes an indication to the content data store that the marked content items are featured content items for the given interest, as well as date information regarding the date on which the marked content were identified as featured content items, step 626, and the process completes, step 618.

Because the interest server writes an indication to the content data store regarding the date at which a given content item is identified as a featured content item, the interest page generator may provide a user with access to archives of featured content items for a given interest. For example, the interest page generator may query the content data store to retrieve those content items for a given month that are featured content items for a given interest, such as providing a link to a page comprising content items that are featured content items for the interest "physics" in the month of August, 2006.

Figure 7:
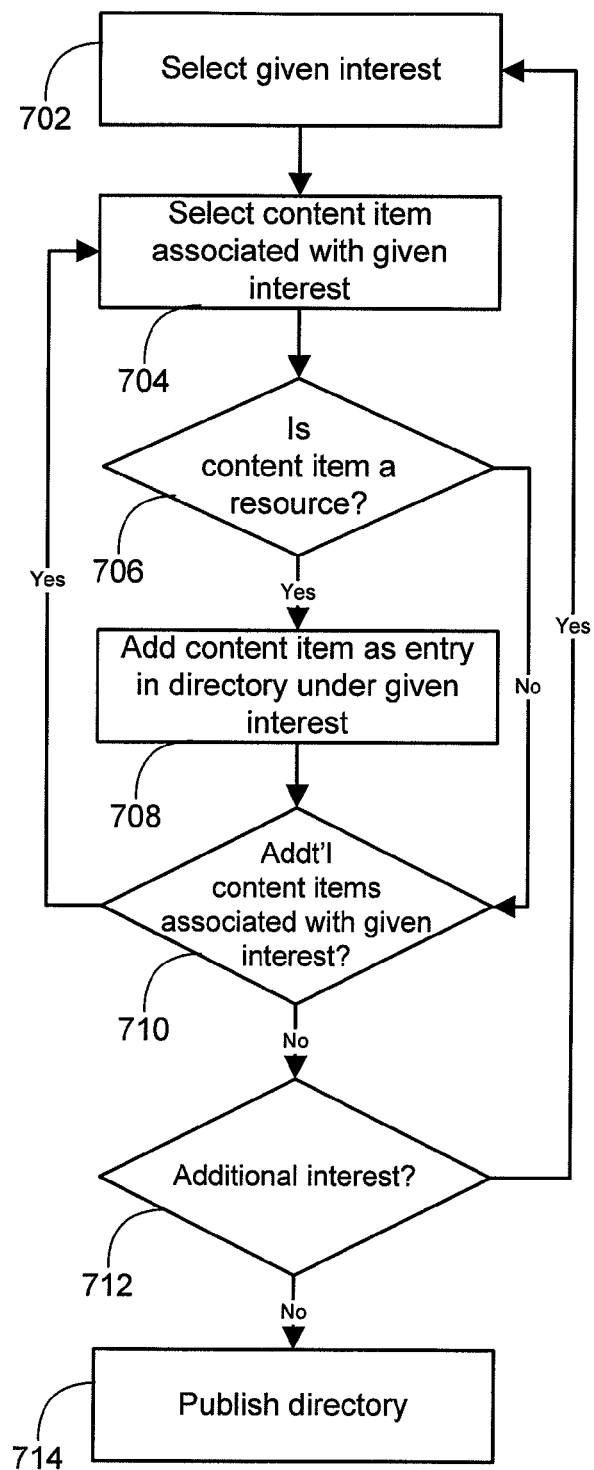
FIG. 7 presents a flow diagram illustrating a method for generating a community build directory on the basis of one or more interests according to one embodiment of the present invention.

As described above, the systems of the present invention may utilize content items associated with one or more interest pages to generate a community built directory. FIG. 7 presents a flow diagram illustrating a method for generating a community build directory on the basis of one or more interests according to one embodiment of the present invention. The process of generating a community built directory begins with the selection of a given interest, step 702.

For the given interest, a content item associated with the given interest is selected, step 704, and a check performed to determine if the content item is a resource, step 706, which may be contrasted with a news story. For example, a content item, or cluster of related content items, that has very few or no saves over a period of time under a given interest, followed by a surge or spike in saves of the content item to the interest and a subsequent gradual decline typically represents a news story. Conversely, a content item, or cluster of related content items, which users save to a given interest at a relatively stable rate as a function of time, may represent a resource, e.g., a reference web site such as a given wikipedia page or a movie database such as IMDB®. According to one embodiment, program code or other business logic at the interest module may analyze historical save information for the content item to identify if the content item is a resource within the given interest.

Where program code or other logic at the interest server determines that the content item is a resource, the interest server adds the content item as an entry in a community built directory whereby the given interest is the directory "heading" and the content item is an entry under the heading, step 708. Regardless of whether the content item is a resource, the interest server performs a check to determine if the given interest is associated with one or more additional content items, step 710. Where the check at step 710 evaluates to true, program flow returns to step 704 with the selection of a subsequent content item. Where no additional content items are associated with the given interest that require processing, the interest server performs a check to determine if content items are associated with one or more additional interests that require processing, step 712. Where the check evaluates to true, program flow returns to step 702 with the interest server selecting a subsequent given resource for processing. Where the check evaluates to false, step 712, the interest server publishes the directory, step 714, and the process terminates.

Figure 8:
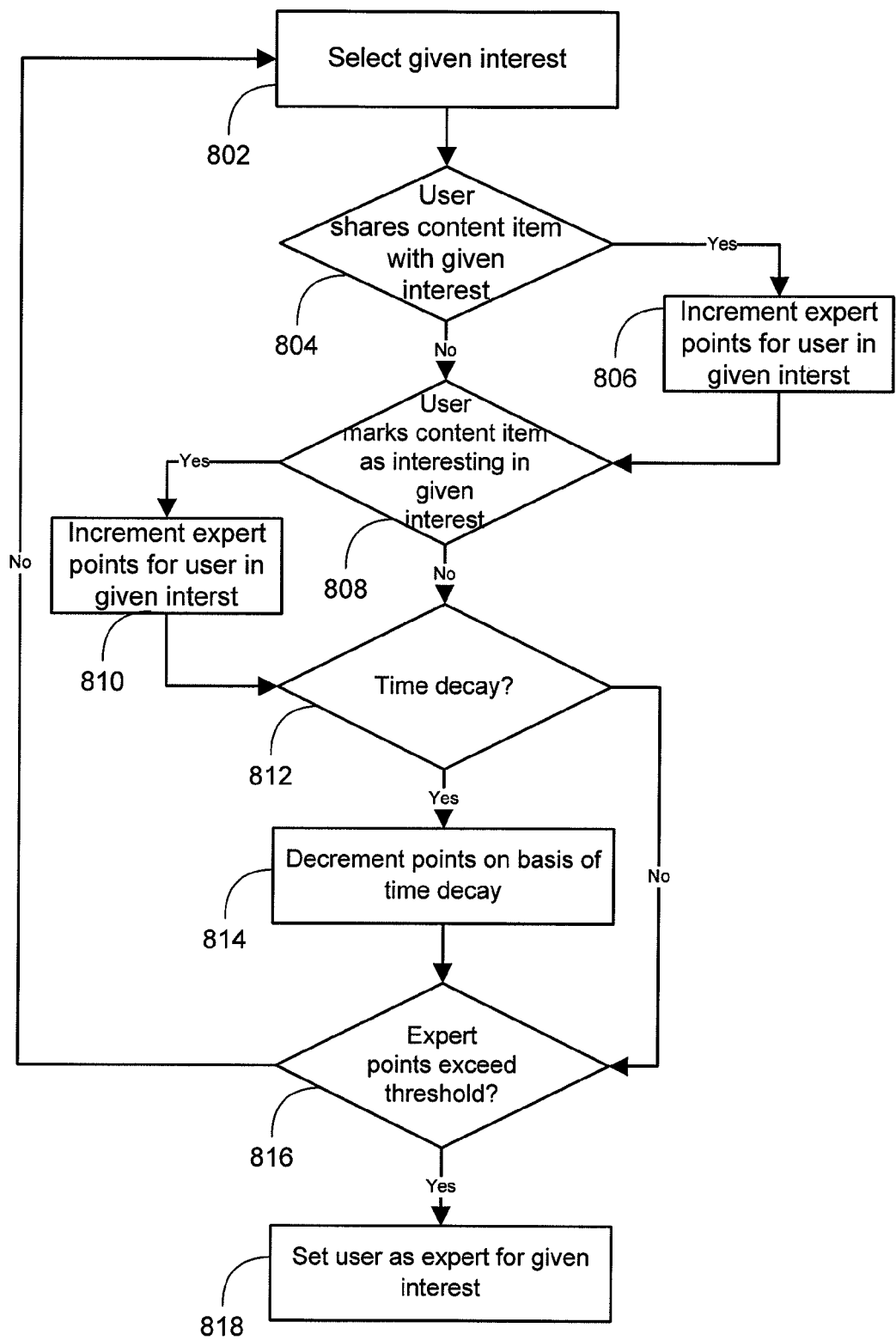
FIG. 8 presents a flow diagram illustrating a method for determining one or more experts for a given interest according to one embodiment of the present invention.

Experts may be associated with a given interest that the interest server maintains. FIG. 8 presents a flow diagram illustrating one embodiment of a method for determining one or more experts for a given interest. The process begins with the selection of a given interest of a given user from among the one or more interests that the interest server maintains, step 802. According to one embodiment, the interest module performs a check to determine if the user shares one or more content items with the given interest, step 804, and if so, increments a number of expert points that the module allots to the user in the given interest, step 806. For example, the interest module may increment the number of expert points for the user for sharing a given content item, and may allot additional points when other users subsequently share the same content item.

A check is also performed to determine if the user marks one or more content items in the given interest as interesting content items, step 808. If the check evaluates to true, the interest module (or other program code at the interest server) may increment the number of expert points that the module allots to the user in the given interest, step 810. Similarly, where other users mark content items that the user shares with the given interest as interesting, the program code at the interest server may increment the number of expert points for the user. Another check that the method may perform is whether other users identify the user as an expert, either generically or one or more specific interests, which may influence the number of expert points that the interest server may allot to the user.

Another check is made to determine if a time decay is applicable to the user, step 812. The basis of the time decay may comprise one or more time windows, a given time window identifying a number of expert points to decrement from the user in the given interest. For example, where the user has not shared a content item with the interest over a number of days, the number of expert points for the user in the given interest may be reduced. Similarly, where other users are not indicating that a content item that the user shares with the interest is interesting for a number of days, the number of expert points for the user in the given interest may be reduced. If a time decay is to be applied, step 812, a total number of experts points for the user in the given interest may be reduced, step 814. Where the number of expert points for the user in the given interest exceeds a threshold, step 816, the user is set as an expert in the given interest and an indication of such is written to the profile of the user, step 818. If the check at step 816 evaluates to false, the interest module selects a subsequent given interest for the user for expert processing in accordance with embodiments of the method of FIG. 8.

Figure 9:
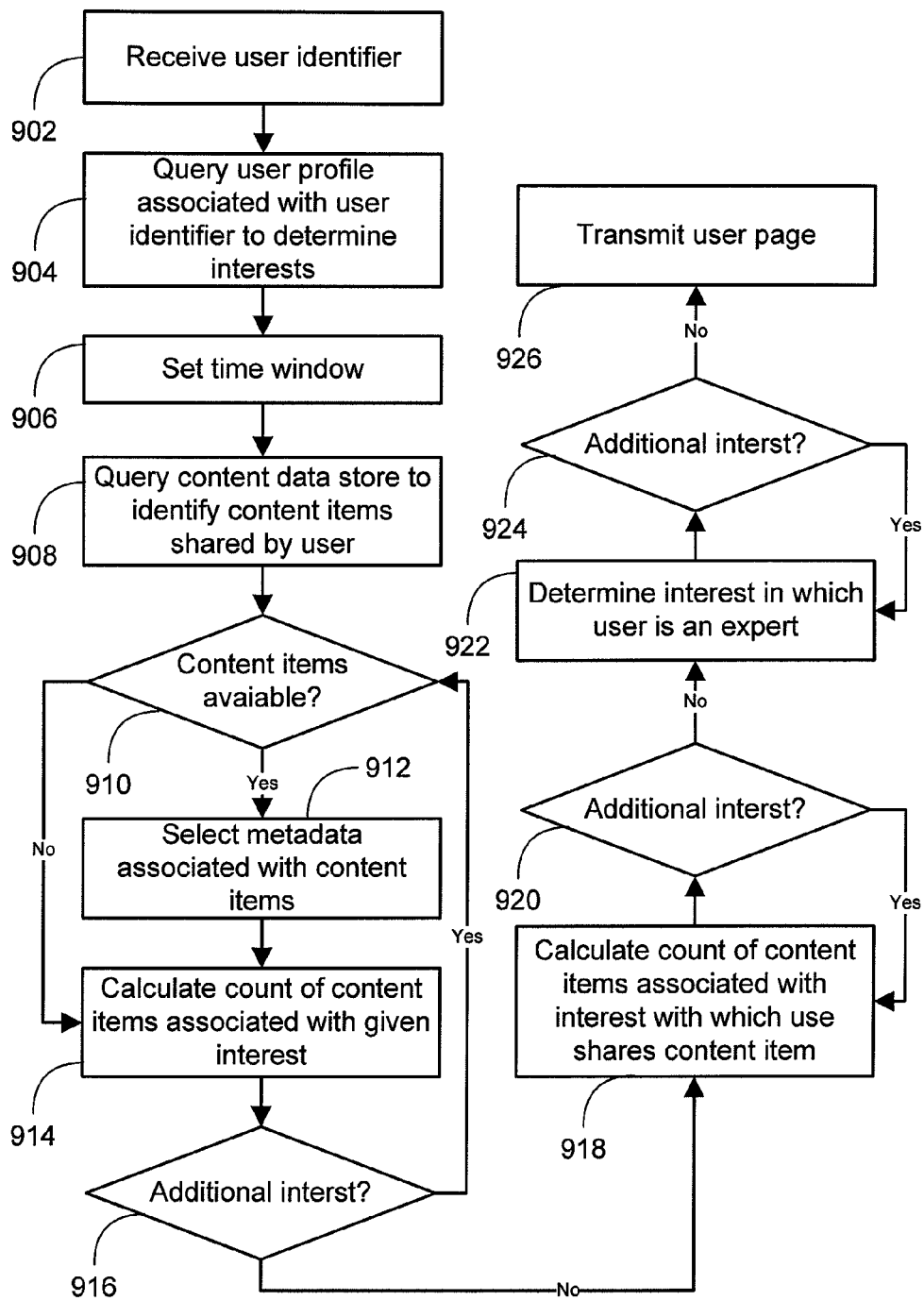
FIG. 9 presents a flow diagram illustrating a method for generating a personal page for a given user according to one embodiment of the present invention.

In addition to generating interest pages, embodiments of the present invention are operative to generate one or more user pages for a given user. FIG. 9 presents a flow diagram illustrating a method for generating a personal page for a given user according to one embodiment of the present invention. The process may begin with the receipt of a user identifier, step 902, e.g., the identifier that the interest module assigns to the user and writes to the user profile for the user. According to one embodiment, the interest page generator receives the user identifier, which may query the user profile for the user to determine his or her interests, step 904.

A time window is set, step 906, and the interest page generator (or other program code at the interest server) queries the content data store to generate a result set identifying content items that the user is sharing with one or more interests, step 908. A check is performed to determine if the result set comprises one or more content items, step 910, and, if true, select metadata associated with the one or more content items, step 912. Metadata according to embodiments of the invention may include, but is not limited to, a date on which the user shares the content item with the interest, a title for the content item, the name of one or more interests with which the user shares the content item, a description of the content item, a thumbnail or reduced size image of the content item, etc. Regardless of the result of the check at step 910, the interest server calculates a count of the number of content items associated with the given interest, step 914. Where there are additional interests for processing, step 916, program flow returns to step 908 with a subsequent given interest.

Processing continues for one or more of the users interests until the check at step 916 evaluates to false, at which point the interest page generator may calculate a count of content items associated with a given interest with which the user shares one or more content items, step 918. A check is performed to determine if there are addition interests with which the user shares one or more content items, step 920, which if true instructs the interest page generator to calculate a count of content items associated with a subsequent given interest with which the user shares one or more content items, step 918. Similarly, the interest page generator may iterate over the one or more interests of the user to determine if the system identifies the user as an expert in any of his or her interests, steps 922 and 924, respectively. The interest page generator may then transmit the user page, step 926. Alternatively, or in conjunction with the foregoing, the interest page generator may store the user page to an interest page data store for persistent storage of the user page.

Figure 10:
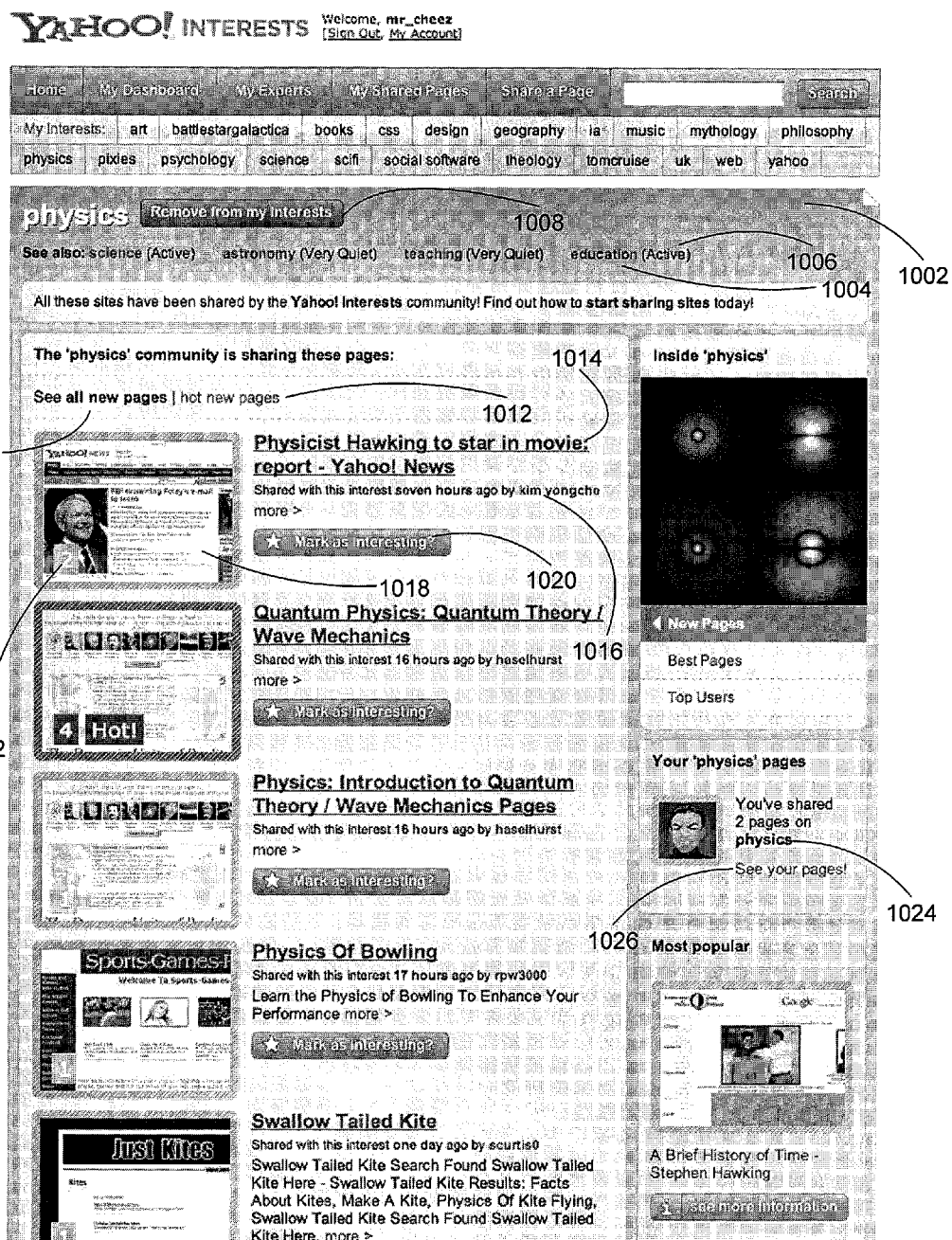
FIG. 10 presents a screen diagram illustrating an interface for an interest page according to one embodiment of the present invention.

FIGS. 10 through 14 present screen diagrams that illustrate various interfaces that embodiments of the present invention may provide for navigating the corpus of content items that the system maintains. FIG. 10 presents a screen diagram illustrating an interface for an interest page according to one embodiment of the present invention. The exemplary interest page 1002, in this case for the interest "physics," provides links to one or more content items that users share with the interest, for example, content item 1018. A given content item associated with the interest 1018 and therefore the interest page 1002, may include the display of a title for the content item 1014, as well as time and user identification information regarding when a given content was shared by a user 1016. The interface may also present a control 1020, the selection of which allows a user to mark a content item as an interesting content item with regard to the interest. A given content item may also include an indication 1022 of the number of users that select the content item as an interesting content item.

A given interest page 1002 may provide links to one or more interests that are related to the current interest. For example, the interest "education" 1004 is related to the interest "physics," which is the subject of the exemplary interest page 1002. Additionally, the interface may display an activity level 1006 for a given related interest 1004, allowing the user to navigate the corpus of interests to identify an interest with a suitable level of granularity on the basis of an acceptable level of activity. A control 1008 also allows the user to indicate that he or she is no longer interested in the exemplary interest, the selection of which removes the interest from the user profile for the given user, which may be executed by program code at the interest module. Controls also allow the user to toggle the content items that the interest page display, e.g., all new pages 1010 for the interest page 1002 or hot new pages 1012 for the interest page 1002.

Figure 11:
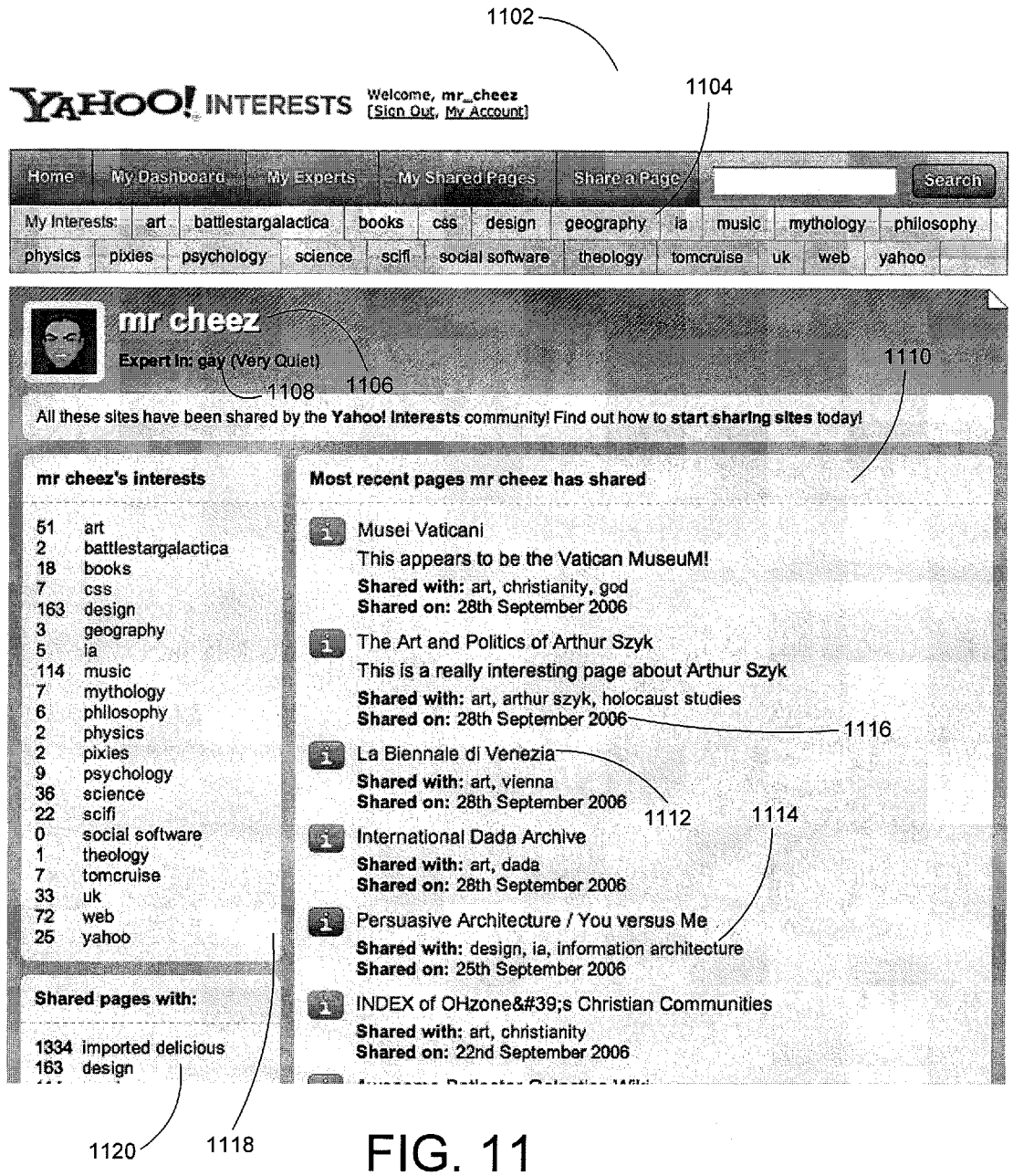
FIG. 11 presents a screen diagram illustrating an interface for a user page according to one embodiment of the present invention.

FIG. 11 presents a screen diagram illustrating an interface for a user page according to one embodiment of the present invention. The exemplary user page 1102 provides a listing of one or more interests to which the user subscribes 1004. The selection of a given interest 1004 loads a corresponding interest page for the interest that the user selects. For example, selection of the "physics" interest 1022 by the user may load the interest page that FIG. 10 illustrates A given user page 1102 indicates a user name 1106 for the given user and may also identify one or more interests in which the given user is an expert 1108. The body of the user page 1102 comprises a three pane interface to display the interests for the given user 1118 (including the number of content items for a given interest), the interests with which the user is sharing content items 1120 (including the number of content items for a given interest) and a detailed view of recent content items that the user is sharing 1110. The pane that displays recent content items that the user is sharing 1110 lists one or more content items, e.g., content item 1112, as well as metadata regarding a given content item, for example, a date 1116 on which the user began sharing the content item with one or more interests, as well as the interests with which the user is sharing the content item 1114.

Figure 12:
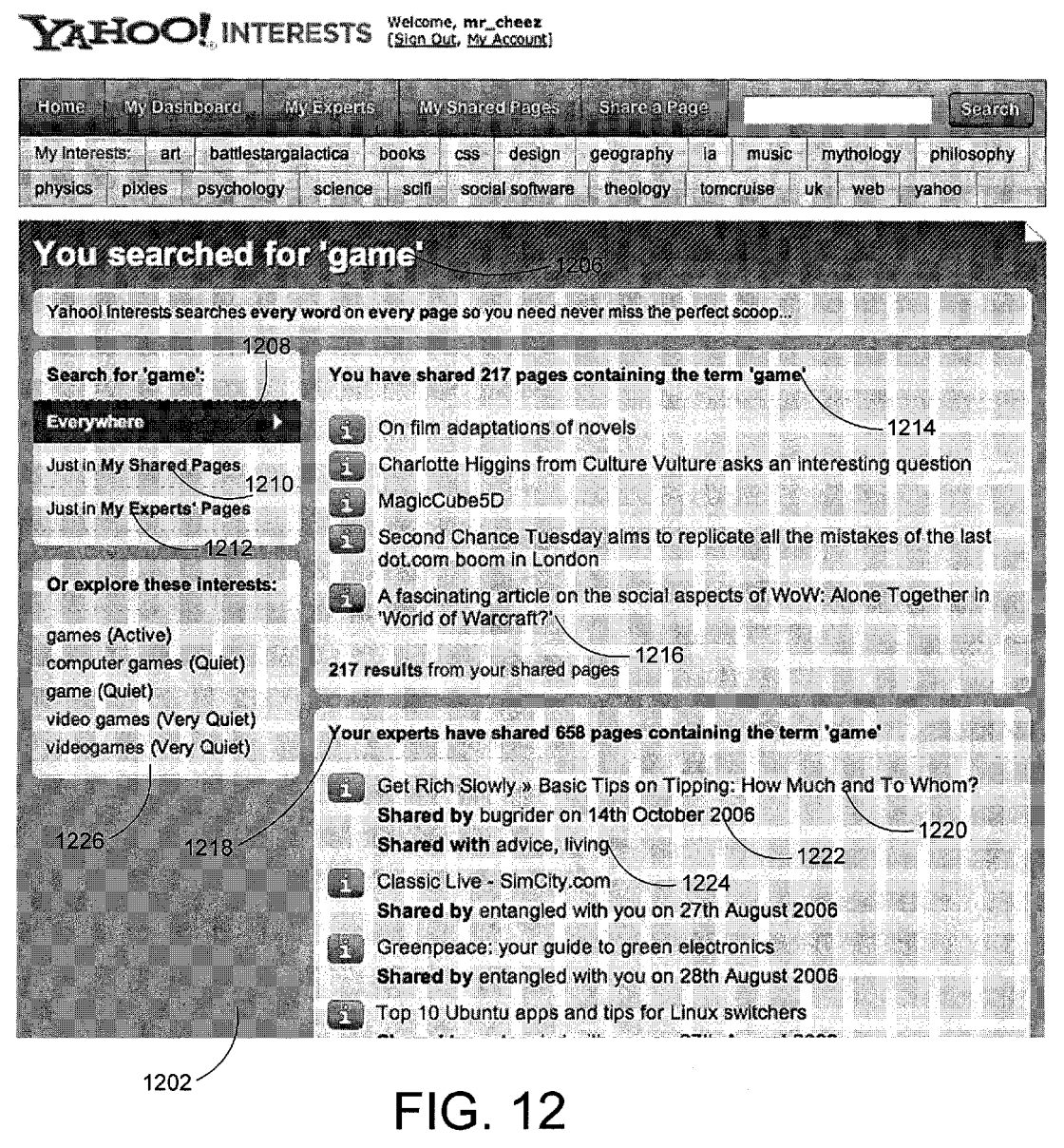

FIG. 12 presents a screen diagram illustrating an interface for a search result page according to one embodiment of the present invention. The exemplary search result page 1202 comprises a pane to display responsive content items that comprise the search term that the user is sharing 1214 with one or more interests (including links to the one or more content items, e.g., 1216), as well as content items that experts for a given user are sharing 1218 with one or more interests. Content items that experts for the user are sharing 1218, for example, content item 1220, may also identify the expert that is sharing the content item and the data on which the expert began sharing the content item 1222, as well as the interests 1224 with which the expert is sharing the content item 1220.

The exemplary search results page 1202 may also comprise navigation and filtering controls that allow the user to restrict items that the interface displays as part of the result set and other interests related to the term on which the user is searching. For example, the user may filter the result set such that the display only presents those content items that the user is sharing 1210, content items that the experts for the user are sharing 1212, or both 1208. On the basis of the search term that the user provides 1206, systems and methods of the present invention may provide and the interface may display interests that are related to the search term 1226.

Figure 13:
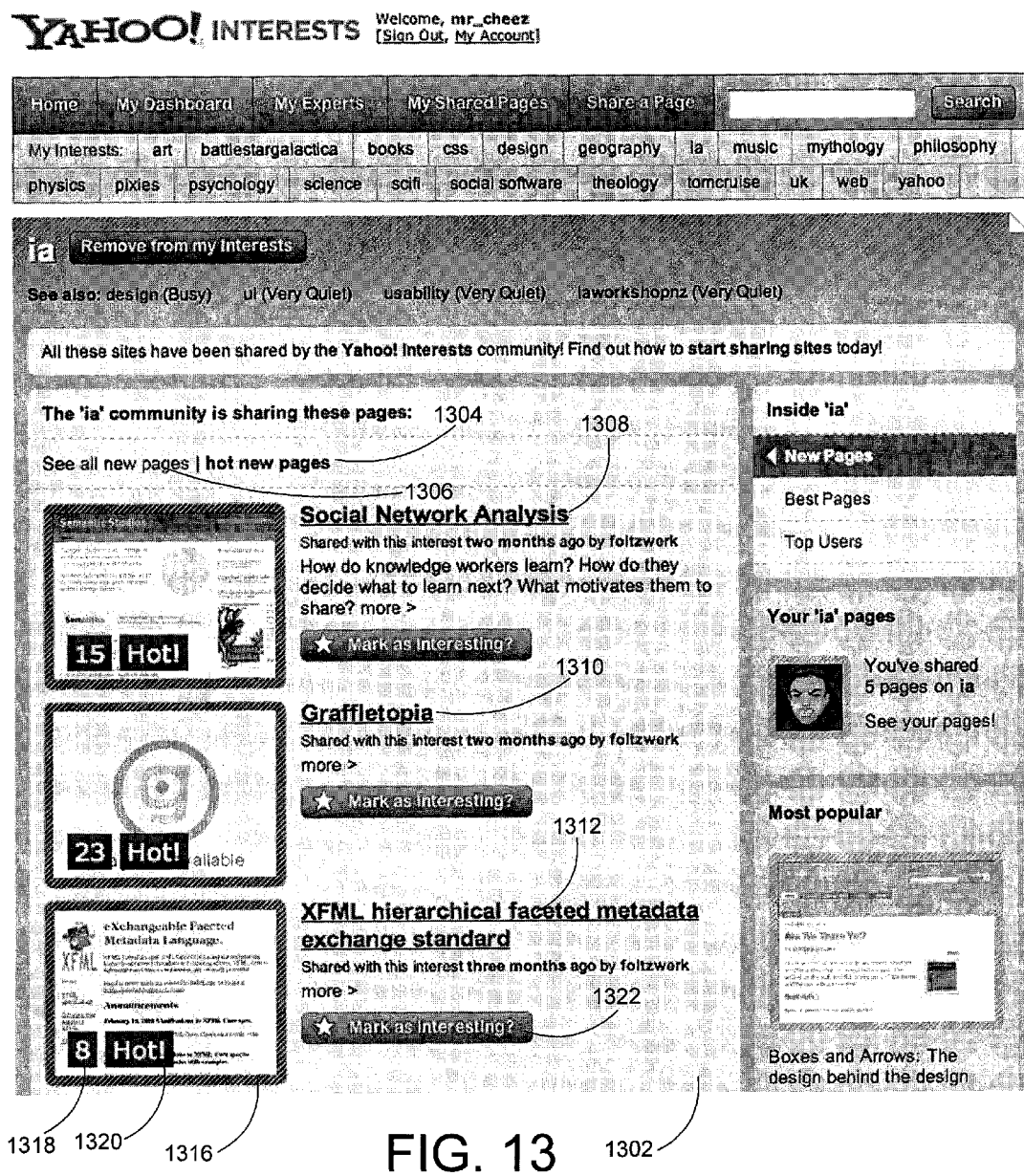
FIG. 13 presents a screen diagram illustrating an interface for active content items in a given interest according to one embodiment of the present invention.

FIG. 13 presents a screen diagram illustrating an interface for active content items in a given interest according to one embodiment of the present invention. The exemplary interface 1302 provide access to one or more "hot" content items for a given interest 1308, 1310 and 1312, e.g., a content item that a number of users above a threshold are indicating are interesting. For a given content item 1312, the interface may display a thumbnail or reduced size view of the content item 1316, a numeric indictor representing the number of users 1318 who are indicating that the content item is interesting and an indication that the content item is a "hot" content item. Additionally, the interface provides controls to mark a given content items as an interesting content item 1322, as well as toggle the interface between the display of hot new content item 1304 and all new content items 1306.

Figure 14:
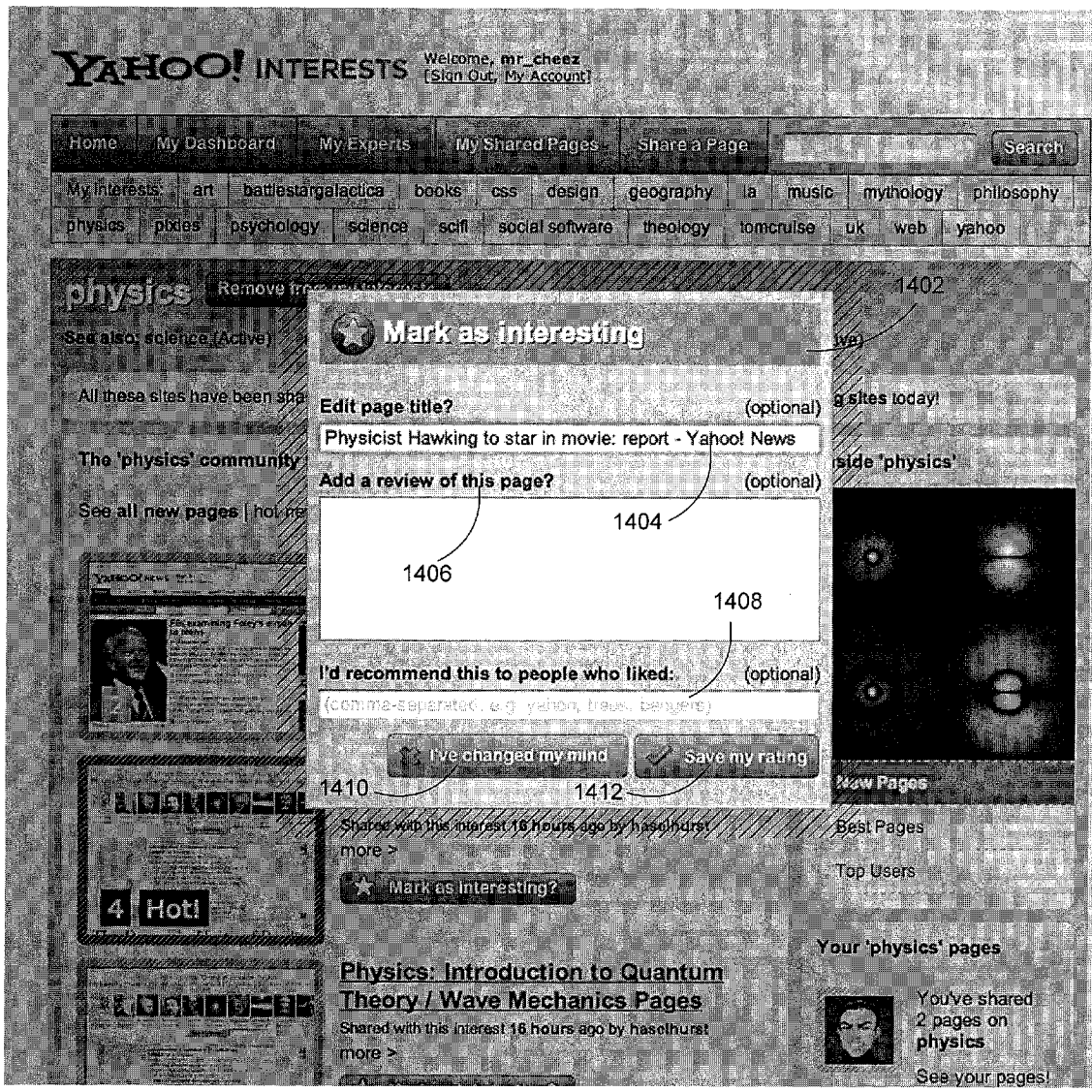
FIG. 14 presents a screen diagram illustrating an interface for identifying a content item as an interesting content item and propagating a content item over one or more interests according to one embodiment of the present invention.

FIG. 14 presents a screen diagram illustrating an interface for identifying a content item as an interesting content item and propagating a content item over one or more interests according to one embodiment of the present invention. The exemplary dialog box 1402 allows the user to identify a title for the content item 1404 that may differ from the actual title of the content item, a review or description 1406 of the content item and one or more interests to which the system should propagate the content item 1408. The one or more interests to which the system should propagate the content item may be a comma or space separated list of interests. By saving the information 1412, the system associates the content item with one or more other interests that the user identifies. If the user selects a cancel control 1410, the dialog 1402 closes and the system does not save the data.

FIGS. 1 through 14 are conceptual illustrations allowing an explanation of the present invention. It should be understood that various aspects of the embodiments of the present invention could be implemented in hardware, firmware, software, or a combination thereof. In such an embodiment, the various components and/or steps would be implemented in hardware, firmware, and/or software to perform the functions of the present invention. That is, the same piece of hardware, firmware, or module of software could perform one or more of the illustrated blocks (e.g., components or steps). Unless explicitly stated otherwise herein, the ordering or arrangement of the steps and/or components should not be limited to the descriptions and/or illustrations hereof.

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, or the like); or the like.

Notably, the figures and examples above are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein.

It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). Moreover, it is not intended for any term in the specification or claims to be ascribed an uncommon or special meaning unless explicitly set forth as such. Further, the present invention encompasses present and future known equivalents to the known components referred to herein by way of illustration. While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computer implemented method for organizing user interest in one or more items within a distributed communications system, the method comprising:

via at least one processing device, obtaining a plurality of interests each associated with an activity level, wherein the activity level with respect to a given interest is determined based on the number or amount of content items associated with the given interest over a period of time;

via the at least one processing device, determining among the plurality of interests, a first interest that is associated with an activity level not exceeding a first threshold;

via the at least one processing device, determining among the plurality of interests, at least one other interest that is related to the first interest and associated with an activity level exceeding a second threshold, wherein the first interest and the at least one other interest are different; and via the at least one processing device and based on the determining of the first interest and the at least one other interest, generating an interest page, the interest page comprising:

a tag representing the determined first interest;

one or more links each to at least one content item associated with the determined first interest; and one or more links each to the determined at least one other interest.

2. The method of claim 1 wherein each activity level is determined by a number of times the user saves a link to a content item associated with each of the plurality of interests.

3. The method of claim 1 wherein the interest page is periodically updated based on at least two of: time, the first or second threshold, and observed user activity.

4. The method of claim 1 wherein the interest page comprises a featured content item.

5. The method of claim 1, further comprising generating a user page comprising a listing of one or more interests a user subscribes to.

6. The method of claim 5, comprising selecting at least one content item associated with an interest in one of the interest page and the user page, and communicating a link to the selected at least one content item to a community of users.

7. The method of claim 6, wherein the user page further comprises interests associated with the content items that the user is sharing and a detailed view of recent content items the user is sharing.

8. The method of claim 1, further comprising rewarding a user for sharing a link to the content item, wherein the rewarding comprises assigning one or more points to a user for sharing the link to the content item.

9. The method of claim 8, further comprising designating the user as an expert for the one or more interests related to each of the content item when a certain number of points is obtained; and storing the expert designation to a profile associated with the user.

10. The method of claim 9, wherein the user profile comprises one or more link to contents item associated with each of the plurality of the user's interests; the method comprises generating an expert page comprising the one or more links to the content items.

11. The method of claim 8, further comprising decrementing a number of points assigned to the user after expiration of a time window.

12. The method of claim 1, further comprising receiving a vote from the user indicating that the content item is an interesting content item; and generating a community page comprising the voted content item.

13. The methods of claim 1, further comprising: receiving keywords from the user; performing a search based on the keywords; returning a result set based on the keywords and the user's interests.

14. The method of claim 1, wherein the interest page further comprises one or more links to a user page of another user in a community of users that shared the content item with the community of users.

15. A distributed communications system comprising at least one server coupled to at least one client device over a network, the at least one server comprises:

an interest module configured for:

obtaining a plurality of interests each associated with an activity level, wherein the activity level with respect to a given interest is determined based on the number or amount of content items associated with the given interest over a period of time, determining among the plurality of interests, a first interest that is associated with an activity level not exceeding a first threshold, and determining among the plurality of interests, at least one other interest that is related to the first interest and associated with an activity level exceeding a second threshold, wherein the first interest and the at least one other interest are different; and an interest page generator configured for, based on the determining of the first interest and the at least one other interest, generating an interest page, the interest page comprising:

a tag representing the determined first interest;

one or more links each to at least one content item associated with the determined first interest; and one or more links each to the determined at least one other interest.

16. The system of claim 15 wherein each activity level is determined by a number of times the user saves a link to a content item associated with each of the plurality of interests.

17. The system of claim 15, wherein the interest page is displayed in a dashboard or tabbed interface comprising links to most popular content items or links to newest content items.

18. The system of claim 15, wherein the interest page further comprises an indication of each user who supplied the links to the content items and a link to the user's personal page.

19. The system of claim 15, wherein the interest page is periodically updated based on at least two of: time, the first or second threshold, and observed user activity.

20. The system of claim 19, wherein the first or the second threshold comprises a ranking function or vote, and wherein the server updates the interest page when the first or second threshold is exceeded.

21. The system of claim 15, the interest module is further configured for determining one or more interests to which the one or more content items belongs based on input from the one or more users.

22. The system of claim 15, the at least one server is configured for designating the one or more users based on the first or second threshold, contributions, votes, or weights, and storing the designation to one or more profiles related to the one or more users.

23. The system of claim 15, the at least one server is configured for generating a user page comprising a listing of one or more interests to which the user subscribes.

24. The system of claim 23 wherein the user page further comprises: the interests associated with the content items the user is sharing and a detailed view of recent content items the user is sharing.

* * * * *